United States Patent [19]

Butler et al.

[11] Patent Number: 5,064,106
[45] Date of Patent: Nov. 12, 1991

[54] METERED DISPENSING PACKAGE

[75] Inventors: Michael E. Butler, New Malden, United Kingdom; David V. Cann, Stonehill; Lee Burrowes, Horsell, both of England

[73] Assignee: The Procter & Gamble Company, Cincinnati, Ohio

[21] Appl. No.: 556,609

[22] Filed: Jul. 20, 1990

[30] Foreign Application Priority Data

Jul. 26, 1989 [GB] United Kingdom ............ 8917070

[51] Int. Cl.⁵ .................................................. G01F 11/26
[52] U.S. Cl. ............................................ 222/456; 222/438
[58] Field of Search ............. 222/205, 207, 434, 438, 222/454–456

[56] References Cited

U.S. PATENT DOCUMENTS

| 1,957,326 | 5/1934 | Day | 221/98 |
| 2,752,076 | 6/1956 | Locker | 222/455 |
| 4,151,934 | 5/1979 | Saeki | 222/437 |
| 4,170,318 | 10/1979 | Saeki et al. | 222/455 |

FOREIGN PATENT DOCUMENTS

| 0194407 | 9/1986 | European Pat. Off. | |
| 2557694 | 6/1977 | Fed. Rep. of Germany | 222/456 |
| 2735372 | 2/1978 | Fed. Rep. of Germany | 222/455 |
| 774149 | 11/1934 | France | 222/454 |
| 492973 | 4/1954 | Italy | 222/455 |
| 275520 | 3/1982 | Netherlands | 222/455 |

Primary Examiner—Michael S. Huppert
Assistant Examiner—Philippe Derakshani
Attorney, Agent, or Firm—John V. Gorman; Thomas H. O'Flaherty; Richard C. Witte

[57] ABSTRACT

A package for dispensing premeasured quantities of a granular or powdered fluent material, having an elongate container with sloping shoulders and an open, upstanding neck surmounted by an overcap. The overcap has a topwall, a dispensing orifice, an outer skirt, and an inner skirt separate from or partially contiguous with the outer skirt. The inner skirt surrounds the container neck in an overlapping, laterally-spaced relationship. These define a preliminary measuring section above the container neck bounded by the topwall and the inner skirt, a main measuring section bounded by the sloping shoulders and the outer skirt, and an outlet passage located between the inner and outer skirts and communicating with the dispensing orifice. The lateral separation of the inner skirt and container neck is such as to constrict flow of material from the preliminary measuring section to the main measuring section during inversion of the package and to permit such flow on restoring the package to its normal upright position.

11 Claims, 2 Drawing Sheets

METERED DISPENSING PACKAGE

TECHNICAL FIELD

The invention relates to a dispensing package and more particularly to a package for dispensing premeasured quantities of a granular or powdered fluent material such as a detergent, bleaching composition, denture cleansing composition, fertilizer, etc.

BACKGROUND INFORMATION

Various kinds of so-called "fixed volume" discharge devices have been previously described in the art - see for example U.S. Pat. No. 4,151,934, U.S. Pat. No. 4,170,318 which describe devices adapted for mounting on the neck of a container, and EP-A-0194407 which describes a measuring cup which, in use, is mounted inside an opening of a container. However, the devices which are described in the art are structurally and operationally complex, expensive to produce, give variable discharge volume and are difficult to modify to meet differing discharge requirements.

DISCLOSURE OF INVENTION

The present invention provides a simple but effective solution to these various problems.

Accordingly, the present invention provides a package for dispensing premeasured quantities of a granular or powdered fluent material, the package comprising:
a) an elongate container having sloping shoulders and an open, upstanding neck, the container being surmounted by
b) an overcap having a ceiling (i.e. topwall), a dispensing orifice, an outer skirt, and an inner skirt separate from or partially contiguous with the outer skirt and which surrounds the container neck in overlapping, laterally-spaced relationship thereto, wherein the ceiling, outer and inner skirts, neck and sloping shoulders together cooperate to define a preliminary measuring section above the container neck bounded by the ceiling and the inner skirt, a main measuring section bounded by the sloping shoulders and the outer skirt, and an outlet passage located between the inner and outer skirts and communicating with the dispensing orifice, and wherein the lateral separation of the inner skirt and container neck is such as to constrict flow of material from the preliminary measuring section to the main measuring section during inversion of the package and to permit such flow on restoring the package to its normal upright position.

In preferred embodiments, the inner skirt is separate from the outer skirt and surrounds the container neck in overlapping, laterally-spaced relationship thereto, whereby the skirt and neck cooperate to form an annular constriction to flow of material from the preliminary measuring section during inversion of the dispensing package. Preferably, the inner skirt and container neck are parallel to one another and have a lateral separation such that the area of the transverse section between the skirt and neck is from about 10% to about 70%, preferably from about 25% to about 40% of the area of the transverse section bounded by the inner skirt. Embodiments in which the container neck has a contoured (e.g. conical or parabolic) shape are also envisaged herein, however, in which case the relative areas of skirt and neck refer to a transverse plane through the lowermost edge of the inner skirt. It is also desirable that the overlap between the inner skirt and container neck is from about 10% to about 90%, preferably from about 30% to about 60% of the longitudinal length of the inner overcap, and while the overcap and neck may partially contact one another (for example, in the region of the inner skirt or ceiling of the overcap), it is preferred that they do not touch over more than 50% of the circumferential length of the container neck.

In preferred embodiments, the container neck has a generally symmetrical cross-section and is most preferably circular. A symmetrically elongate or oval cross-section is also envisaged in certain embodiments however. Suitably, the inner skirt has a generally circular, truncated circular or oval cross-section and is concentric with the container neck. However, embodiments in which the container neck is offset relative to the inner skirt are also envisaged herein. Also the dispensing orifice is normally itself in an offset position relative to the longitudinal axis of the container.

In other non-illustrated embodiments, the inner skirt is partially contiguous with the outer skirt whereby the inner skirt forms a partition extending generally transverse the normal plane of tilt on at least that side of the container neck proximal the dispensing orifice or, if appropriate, on either side of the container neck.

In these embodiments, it will be understood that the lateral separation of the container neck from the partition or partitions and from those portions of the inner skirt contiguous with the outer skirt, is such as to provide the annular constriction to flow of material from the preliminary measuring section during inversion of the dispensing package.

From the viewpoint of achieving a more reliable (i.e. less variable) discharge-volume, the package of the invention is preferably arranged or includes means for deflecting the flow of material from the preliminary measuring section in a direction sideways to the normal plane of tilt of the package as the package is restored after inversion to its normal upright position. In this context, the "normal plane of the tilt" of the package is taken to be a vertical plane including the longitudinal axis of the container and which passes through the center of the dispensing orifice. If the dispensing orifice is not transversely offset, however, the normal plane of tilt may be defined by reference to indicia marked on the container or cap.

In a preferred arrangement, the relative shape and disposition of the inner skirt and container neck are such as to constrict flow of the material from the preliminary measuring section in directions along the normal plane of tilt of the package when the package is restored after inversion to its normal upright position, whereby the material is deflected or encouraged to flow in directions sideways to the normal plane of tilt.

The sideways deflection of material can be achieved in various ways. In a preferred execution, however, the inner skirt is generally oval (for example, a truncated circular cross-section) and is disposed with its major axis transverse the normal plane of tilt. In the case of a truncated circular cross-section, moreover, it is important that the skirt should have a truncated portion on at least that side of the container neck proximal the dispensing orifice. The positioning of the inner skirt relative to the container neck is then chosen so as restrict flow of material in directions along the normal plane of tilt but to allow flow of material in a sideways direction.

Other suitable means for deflecting or encouraging the flow of material in a sideways direction include the provision of a downward inflection in the ceiling of the overcap or of one or more baffles which, in either instance, project downwardly towards or into the container neck and which act to constrict flow of material in a forward direction as the packaged is restored to its normal upright position.

It is also preferred herein that the overcap is moveable relative to the container neck in order to seal the container when not in use or in order to adjust the effective volume of the preliminary measuring section.

BRIEF DESCRIPTION OF THE DRAWINGS

Other features and advantages of the invention will be apparent from the following description taken in conjunction with the accompanying drawings in which.

DESCRIPTION OF THE PREFERRED EMBODIMENT

Figure 1:
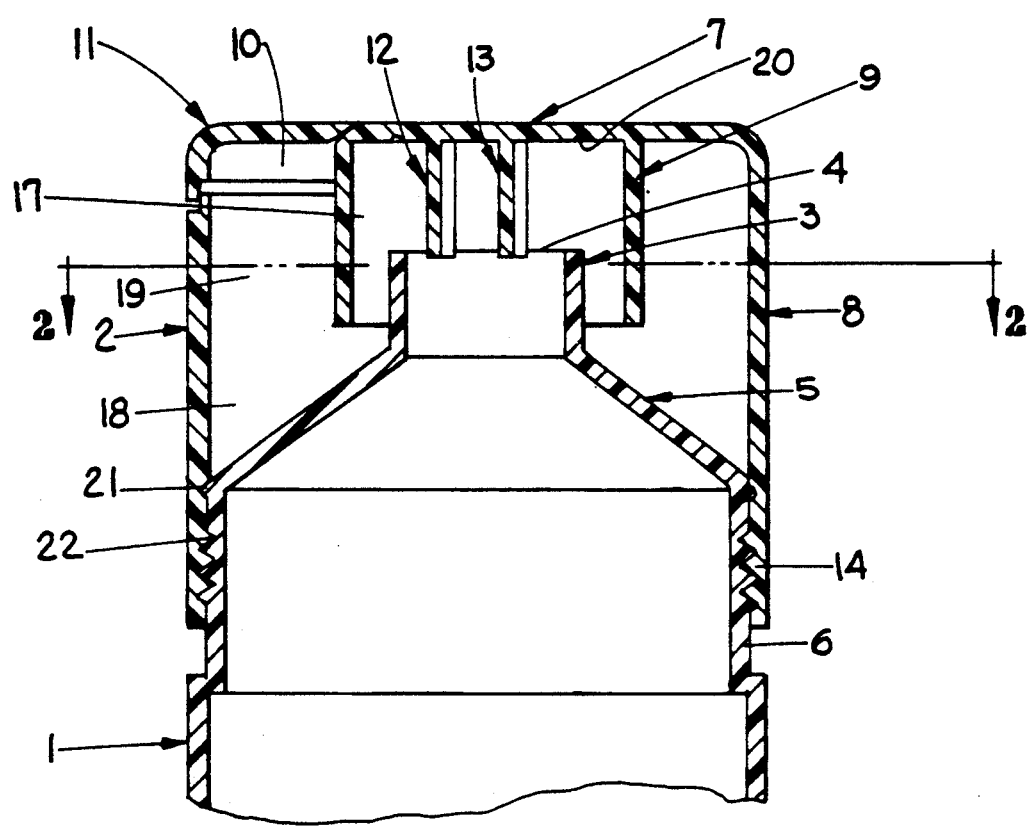
FIG. 1 illustrates a preferred embodiment of the invention wherein the package is shown in a fragmentary vertical cross-sectional view.
Figure 2:
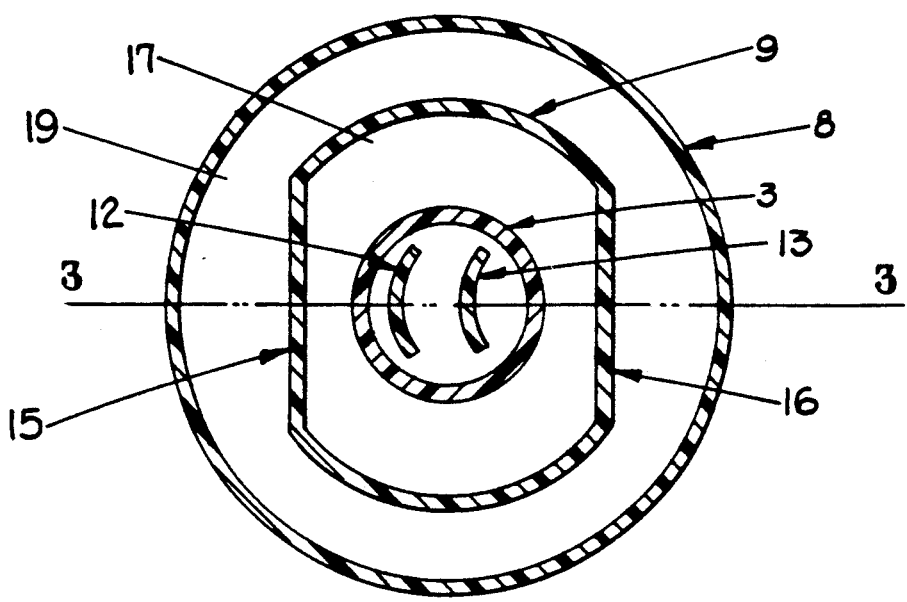
FIG. 2 is a horizontal cross-sectional view taken along line 2—2 of FIG. 1.
Figure 3:
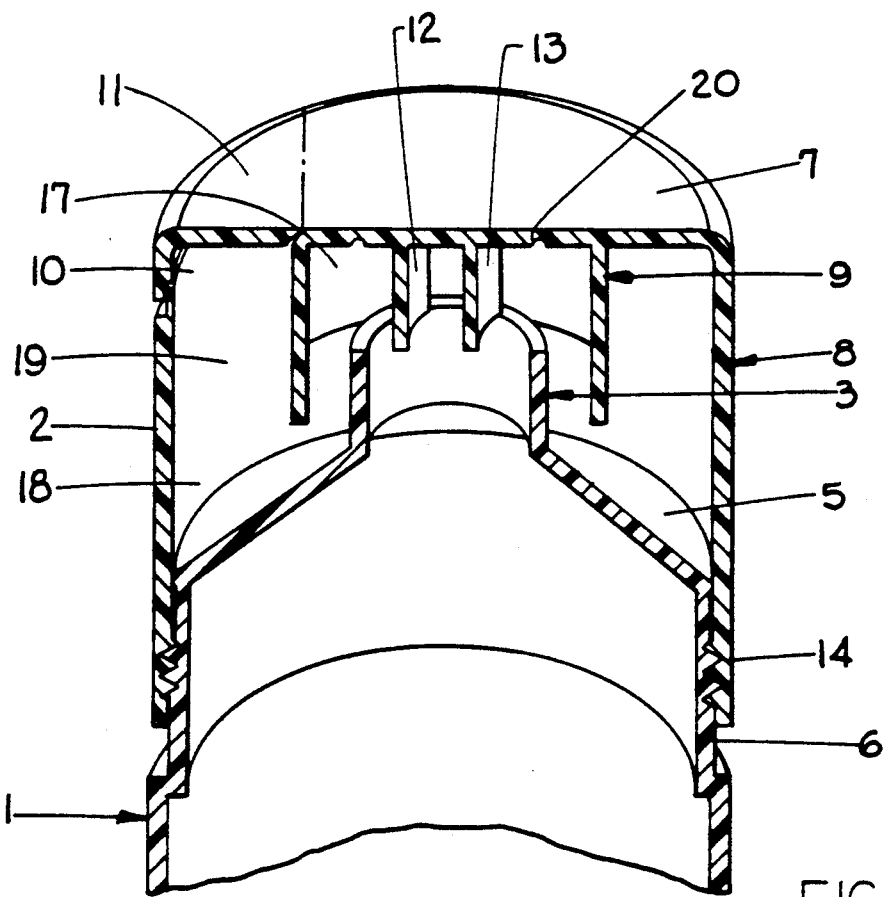
FIG. 3 is a view similar to FIG. 1 but seen in cutaway perspective.

Referring to FIGS. 1 to 3, a preferred embodiment of the invention will now be described.

A package for dispensing premeasured quantities of a granular or powdered fluent material according to this embodiment comprises an elongate container 1 and an overcap 2, both of generally circular cross-section. The container 1 which is formed as an integral molded article, comprises a neck 3 having an opening 4 therein which, in this embodiment, is also of a circular cross-section. The neck terminates at its lowermost end in sloping shoulder portion 5 having a generally frustoconical cross-section.

The container is also provided with an inwardly-offset circumferential threaded portion 6 at the base of sloping shoulder portion 5 and which is adapted to engage with a corresponding threaded portion on the overcap as described below.

The overcap 2 itself comprises ceiling or topwall 7, outer circumferential skirt 8, inner skirt 9, dispensing orifice 10, closure cover 11, and baffles 12 and 13. Outer skirt 8 and inner skirt 9 both extend generally downwardly from ceiling 7, outer skirt 8 terminating in a threaded portion 14 which is adapted to engage with the corresponding threaded portion 6 of container 1.

In other embodiments of the invention, however, overcap 2 can be snap-engaged with container 1 by means of projections and associated recessed on the overcap and container.

Dispensing orifice 10 is a segmentally-shaped opening located within ceiling 7 in the region bounded by the lines of intersection of ceiling 7 with inner skirt 9 and outer skirt 8 and is covered by hinged closure cover 11. The vertical plane marked in FIG. 2 by the line 3—3 through the centers of container 1 and of dispensing orifice 10 is referred to herein as the "normal plane of tilt".

Inner skirt 9 extends downwardly from ceiling 7 for a length sufficient to overlap container neck 3. As best seen in FIG. 2, inner skirt 9 in this embodiment has a truncated circular cross-section, wherein the skirt comprises opposed truncated side portions 15 and 16 disposed on either side of container neck 3 and in close proximity thereto, the orientation of inner skirt 9 being such that its major axis is transverse to the normal plane of tilt 3—3. In other non-illustrated embodiments however, inner skirt 9 has a generally circular cross-section while container neck 3 has an elongate cross-section and is disposed centrally within the inner skirt with its major axis generally parallel to the plane of tilt. Again, the shape and relative disposition of the skirt and neck are such as to restrict flow of material along the normal plane of tilt and to encourage flow in a sideways direction. Baffles 12 and 13 take the form of in-line vertical plates which project downwardly from ceiling 7 towards and just into container neck 3, each baffle being of generally arcuate cross-section and disposed symmetrically about the normal plane of tilt 3—3 with its concave surface proximal dispensing orifice 10.

Ceiling 7, outer skirt 8, inner skirt 9 and sloping shoulder portion 5 together cooperate to define preliminary measuring section 17 above and around container neck 3, main measuring section 18 and outlet passage 19 which communicates at its outlet end with dispensing orifice 10.

In use, closure cover 11 is opened and the package is tilted along the normal plane of tilt until it assumes a generally inverted attitude and is then restored to its normal upright position. Tilting of the package in this manner charges preliminary measuring section 17 with a volume of granular or powdered fluent material as determined by the size, shape and relative variation of inner skirt 9, container neck 3 and baffles 12 and 13.

When the package is restored to its upright position, the contents of preliminary measuring section 17 fall generally sideways to the plane of tilt and into main measuring section 18. If main measuring section 18 has already been charged by previous tilting and restoration of the package, the contents of main measuring section 18 are discharged through outlet passage 19 and dispensing orifice 10 at the same time as preliminary measuring section 17 is charged during tilting of the package. Otherwise, the package is inverted for a second time in order to discharge the contents of main measuring section 18 through the dispensing orifice.

During storage or when the package is not in use, the package can be sealed by screwing overcap 2 onto container 1 until the top end of neck 3 comes into contact with annular cone seal 20 provided on the undersurface of ceiling 7, the pitch of cooperating thread portions 6 and 14 being such that overcap 2 is moved between open and closed positions with a single twist of the hand (in practice, a 2:1 ratio pitch being used).

Moreover, in order to prevent dusting of the contents of the overcap into the area of threaded portions 6 and 14, a dust seal is provided in the form of two interfering rings 21 and 22 disposed respectively on the peripheral outer surface of container 1 and the peripheral inner surface of outer skirt 8. Interfering rings 21 and 22 also act as a stop to prevent inadvertent removal of overcap 2 from container 1.

The package of the invention provides significant advantages in terms of structural simplicity, ease of manufacturing, constant discharge volumes and ease of modification. The package can be of a simple two-piece construction and the discharge volume can be easily modified merely by altering the length of the container neck, a modification which represents a trivial on-line manufacturing change. Alternatively, the discharge volume can be modified by altering the transverse diameter or longitudinal length of the inner skirt.

In addition, the granular or powdered product can be sold in a separate non-dispensing container and the overcap screwed or otherwise attached to the container by the customer in the home. The single construction and ease of use of the package makes it a simple task for the customer to transfer the overcap from one container to another when the previous container is exhausted.

Alternatively, the package can be sold with a removable freshness seal secured to the outer end of the dispensing orifice, the overcap being removed by the customer in order to allow access to the seal. In these embodiments the overcap and container can be threadably or otherwise engaged in order to allow separation of the overcap and container but otherwise the overcap is retained in a static, permanently open position during subsequent use of the package by the consumer.

What is claimed is:

1. A package for dispensing premeasured quantities of a granular or powdered fluent material, the package comprising:
   a) an elongate container having sloping shoulders and an open, upstanding neck, the container being surmounted by
   b) an overcap having a topwall, a dispensing orifice, an outer skirt, and an inner skirt separate form a partially a contiguous with the outer skirt and which surrounds the container neck in overlapping, laterally-spaced relationship thereto, and
   c) a normal plane of tilt which includes the longitudinal axis of the container and the midpoint of the dispensing orifice,
   wherein a preliminary measuring section is defined above the container neck bounded by the topwall and the inner skirt, a main measuring section is formed bounded by the sloping shoulders and the outer skirt, and an outlet passage is located between the inner and outer skirts, communicating with the dispensing orifice, and wherein the lateral separation of the inner skirt and container neck is such as to constrict flow of material from the preliminary measuring section to the main measuring section during inversion of the package and to permit such flow on restoring the package to its normal upright position, said package including means for deflecting the flow of material from the preliminary measuring section in a direction sideways to the normal plane of tilt of the package as the package is restored after inversion to its normal upright position wherein the deflecting means comprises one or more baffles which project downwardly towards the container neck.

2. A package according to claim 1 wherein the inner skirt is separate from the outer skirt and surrounds the container neck in overlapping, laterally-spaced relationship thereto, whereby the skirt and neck cooperate to form an annular constriction to flow of material from the preliminary measuring section during inversion of the dispensing package.

3. A package according to claim 2 wherein the inner skirt and container neck are parallel to one another and wherein the inner skirt and container neck have a lateral separation such that the area of the transverse section between the skirt and neck is in the range of from about 10% to about 70% of the area of the transverse section bounded by the inner skirt.

4. A package according to claim 3 wherein the area of the transverse section between the skirt and neck is in the range of from about 25% to about 40% of the area of the transverse section bounded by the inner skirt.

5. A package according to any of claims 1 to 4 wherein the container neck has a generally circular cross-section.

6. A package according to claim 5 wherein the inner skirt is concentric with the container neck.

7. A package according to claim 1 wherein the inner skirt is partially contiguous with the outer skirt whereby the inner skirt forms a partition extending generally transverse the normal plane of tilt on at least that side of the container neck proximal the dispensing orifice.

8. A package according to claim 7 wherein the inner skirt forms a partition extending generally transverse the normal plane of tilt on either side of the container neck.

9. A package according to claim 1 wherein the relative shape and disposition of the inner skirt and container neck are such as to constrict flow of the material from the preliminary measuring section in directions along the normal plane of tilt of the package as the package is restored after inversion to its normal upright position, whereby the material is deflected or encouraged to flow in directions sideways to the normal plane of tilt.

10. A package according to claim 9 wherein the inner skirt has a generally oval cross-section and is disposed with its major axis transverses the normal plane of tilt.

11. A package according to any of claims 1 to 4 or 7 to 10 wherein the overcap is moveable relative to the container neck to seal the container when not in use and to adjust the effective volume of the preliminary measuring section.

* * * * *